(12) United States Patent
Farley et al.

(10) Patent No.: US 7,228,348 B1
(45) Date of Patent: Jun. 5, 2007

(54) SYSTEM AND METHOD FOR TRIGGERING COMMUNICATIONS DATA CAPTURE

(75) Inventors: Mark Farley, Napa, CA (US); Douglas Durham, Sunnyvale, CA (US); Lawrence M. Bain, Mt. View, CA (US); Steven R. Klotz, Austin, TX (US); Adam H. Schondelmayer, Cupertino, CA (US)

(73) Assignee: Finisar Corporation, Sunyvale, CA (US)

( * ) Notice: Subject to any disclaimer, the term of this patent is extended or adjusted under 35 U.S.C. 154(b) by 821 days.

(21) Appl. No.: 10/218,343

(22) Filed: Aug. 13, 2002

(51) Int. Cl.
*G06F 13/00* (2006.01)

(52) U.S. Cl. ............... 709/224; 709/249; 709/250; 719/318

(58) Field of Classification Search ............ 709/223, 709/224, 249, 250
See application file for complete search history.

(56) References Cited

U.S. PATENT DOCUMENTS

| | | |
|---|---|---|
| 5,027,297 A | 6/1991 | Garitty et al. |
| 5,590,116 A | 12/1996 | Zhang |
| 5,696,701 A | 12/1997 | Burgess et al. |
| 5,761,424 A | 6/1998 | Adams et al. |
| 5,812,529 A | 9/1998 | Czarnik et al. |
| 5,850,386 A | 12/1998 | Anderson et al. |
| 5,912,701 A | 6/1999 | Morton, Jr. |
| 6,049,545 A | 4/2000 | Stephenson et al. |
| 6,058,116 A | 5/2000 | Hiscock et al. |
| 6,098,157 A | 8/2000 | Hsu et al. |
| 6,243,834 B1 | 6/2001 | Garrett |
| 6,266,789 B1 | 7/2001 | Bucher et al. |
| 6,335,931 B1 | 1/2002 | Strong et al. |
| 6,507,923 B1 | 1/2003 | Wall et al. |
| 6,636,518 B1 | 10/2003 | Liencres |
| 6,639,957 B2 | 10/2003 | Cahil-O'Brien et al. |
| 6,654,352 B2 * | 11/2003 | Serikawa .................. 370/254 |
| 6,654,356 B1 | 11/2003 | Eidson et al. |
| 6,665,725 B1 | 12/2003 | Dietz et al. |
| 6,714,976 B1 * | 3/2004 | Wilson et al. .............. 709/224 |
| 6,789,182 B1 | 9/2004 | Brothers et al. |

(Continued)

FOREIGN PATENT DOCUMENTS

GB    EP0726664 A2    8/1996

(Continued)

OTHER PUBLICATIONS

Web page: Outstanding PC, Webopedia, *Routing in the Internet.*

(Continued)

*Primary Examiner*—Viet D. Vu
(74) *Attorney, Agent, or Firm*—Workman Nydegger

(57) ABSTRACT

A system and method of triggering data capture in a high-speed communications network is disclosed. The triggering system enables the capture of desired data from the network according to triggers related to high-level statistical and transactional elements of the data. The triggering system includes a statistics engine that analyzes network data at the line speed of the high-speed network, thereby enabling the present system to trigger on data transmitted via networks with line speeds exceeding 1 Gbit per second. The present system preferably comprises a portion of a protocol analyzer or similar device in order to detect and diagnose problem conditions existing in or relating to the network data.

28 Claims, 5 Drawing Sheets

U.S. PATENT DOCUMENTS

| | | |
|---|---|---|
| 6,793,539 B1 | 9/2004 | Lee et al. |
| 7,149,189 B2 * | 12/2006 | Huntington et al. ........ 370/235 |
| 2003/0033406 A1 * | 2/2003 | John et al. .................. 709/224 |
| 2003/0204632 A1 * | 10/2003 | Willebeek-LeMair et al. ... 709/249 |
| 2003/0229827 A1 * | 12/2003 | Dun et al. .................... 714/48 |

FOREIGN PATENT DOCUMENTS

| | | |
|---|---|---|
| WO | WO 01/052400 A1 | 7/2002 |

OTHER PUBLICATIONS

Web page: Internetweek.com, Schultz, Keith, *A Complete Solution, Enterasys Networks proves its mettle in enterprise-class switching*, Jan. 22, 2001.

Web page: Marvell Press Release, *Galileo Announces New High-Performance 240-port Ethernet Switch Reference Design*, 1999.

Web page: Outstanding PC, Webopedia, *Routing in the Internet*, no date.

* cited by examiner

SYSTEM AND METHOD FOR TRIGGERING COMMUNICATIONS DATA CAPTURE

BACKGROUND OF THE INVENTION

1. The Field of the Invention

The present invention is generally directed to communications networks. More particularly, the present invention is directed to the use of statistical measures of network traffic to trigger equipment in real time.

2. The Related Technology

A protocol analyzer ("PA") is a fundamental and highly useful tool for testing and debugging various types of communications networks, including computing and computer storage networks, such as a storage area network ("SAN"). A PA operates by capturing selected portions of data from a data stream that is transmitted via the communications network. The captured information may then be analyzed by the PA to extract desired information. For instance, data transmission faults or errors, or performance errors, known generally as problem conditions, may be diagnosed by examining the captured data that is related to the problem. Thus it is seen that, in order to properly diagnose and correct problem conditions in a communications network, one must capture the data relating to the condition.

A PA uses triggers to direct the capture of the desired data in order to detect and diagnose the problem condition. In operation, the PA continually captures consecutive batches of data from the data stream. This captured data is temporarily stored in a capture buffer, where the data remains for a certain length of time before being overwritten by subsequent batches of captured data. Essentially, a trigger is a command that, if actuated, directs the PA to retain in the capture buffer a selected portion of the data stream intercepted from the communications network, thus preventing it from being overwritten and enabling the data to be further analyzed at a later time. This process is generally known as "triggering."

A trigger is typically programmed to trigger data retention based on the detected presence of a trigger condition. A trigger condition is a condition contained in or associated with the data stream that, when present, causes the PA to trigger. As already mentioned, the triggering by the PA causes it to retain a specified portion of the data stream in the capture buffer for later analysis. For example, known PAs are programmed to trigger based on discrete events as defined by a specific bit pattern present in the data stream, such as a specific SCSI command frame. If a bit pattern in the data that is processed by the PA matches the desired command frame bit pattern programmed as the trigger, the PA is triggered and that portion of the data stream is captured by the PA for later analysis. Triggers are typically programmed into the hardware or software of the PA. One of the key attributes of triggering is latency. The PA must be triggered while the data which caused the trigger is still in the capture buffer. This requires the detection of the trigger to occur at a rate approximate to the rate at which data is entering the buffer.

Though the above triggering scheme may sometimes yield the desired results, several problems nonetheless exist. For example, the correct choice and characterization of a trigger to capture a desired portion of the data stream is difficult. Indeed, in order to correctly program a trigger into the PA, a user must know many low level details about the communication protocol entities (e.g. frame formats) in order to know what specific bit pattern to set the trigger to find. This requires in depth knowledge of the nature of the physical and logical protocols of the data stream sent over the communications network. However, as communications networks such as computing and computer storage networks come into more common use, many operators in charge of such networks do not have the requisite knowledge to properly set triggers in order to detect and capture the needed information so as to be able to decipher, detect, and correct problem conditions related to the data stream. As a result, poorly chosen triggers are used, which fails to capture the data necessary for actual problem resolution. This situation can greatly extend the time needed to resolve the problem conditions.

Furthermore, some problem conditions, such as a related sequence of discrete events, or a transactional exchange between network components, cannot be captured by triggering schemes that are based on the simple, bit pattern matching described above. This results in a broad range of problem conditions that are uncapturable based on current triggering techniques.

Another problem has recently developed with respect to the proper triggering and capturing of desired data. Capturing the correct data from the communications network data stream has been made more difficult with the development and increasing use of high-speed network communications equipment and systems that are capable of transmitting information at rates exceeding one and two gigabits ("Gbit") per second. As mentioned above, the PA continually feeds batches of data from the data stream into a capture buffer. This data remains in the capture buffer until overwritten by subsequent batches of data from the data stream, or until a specified trigger is activated, at which point the buffer contents are retained in the capture buffer and the capture of further data from the data stream is terminated. However, in the case of high speed communications networks that transmit at rates exceeding one and two Gbits/second, the PA may not be able to acquire and process incoming data packets fast enough in order to trigger the capture of desired data packets before they are overwritten by new, incoming data in the buffer. In other words, by the time the PA has processed the data and activated the trigger, the desired data packets that were temporarily held in the buffer have already been overwritten by subsequent incoming batches of data from the high speed data stream. This delay between triggering and capturing the desired data is exacerbated if the trigger code is software-based as opposed to hardware or firmware-based. In such a case, the buffer has often already overwritten the data of interest by the time the software has processed and activated the trigger. Moreover, data received from a high-speed communications network fills up the buffer faster than data from a relatively lower-speed network, thus further exacerbating the problem of adequate data capture with known triggering systems.

A need therefore exists for a PA or associated apparatus that enables triggering based upon parameters that are easily determined by end users who are not intimately familiar with the in-depth characteristics of data traffic and protocol typical of high-speed communications networks. Such an apparatus should also enable triggering on a different and wider range of traffic characteristics than what is currently possible with known systems. A further need exists for a PA that possesses this trigger capability while operating at the line speed of high-speed communications networks so as to avoid the loss of captured data as a result of latency between the triggering and overwriting of data within the buffer.

BRIEF SUMMARY OF THE INVENTION

The present invention has been developed in response to the above and other needs in the art. Briefly summarized, embodiments of the present invention are directed to a system and method for triggering data capture in a high-speed communications network. The present triggering system is preferably incorporated as a component of a protocol analyzer ("PA") or other appropriate data processing device. In contrast to known triggering systems, which require difficult identification and programming of triggers based on specific bit patterns in the communications network data stream, the present invention enables the end user to easily select triggers for data capture based on recognizable and definable characteristics of the data stream. Moreover, the present triggering system enables triggering based on a wider range of network traffic characteristics than what is possible with known protocol analyzers.

The statistics or characteristics of the data packets contained in the data stream of the communications network are synchronously analyzed and accumulated by embodiments of the present system on a real-time, line speed basis, thereby providing a higher level of information about the data stream than what is possible in known PAs. This enables the PA to perform comprehensive data analysis and capture on communications networks operating at line speeds exceeding one and two Gbits per second without suffering unintended data loss because of subsequent overwriting of the capture buffer. Significantly, the present invention enables the data to be analyzed at a rate equal to the line speed of the communications network, thereby allowing desired data portions to be captured for later analysis by a technician or other user. This serves as a significant advancement over known systems, where initial analysis of the data stream at a rate synchronous with the line speed is not possible.

The triggering system generally comprises a statistics engine, a statistics buffer, a trigger component, and traffic capture components. The statistics engine performs high-level analysis on communications traffic that is inputted to it via a communications medium. Pertinent statistical and transactional information relating to a chosen trigger is derived from analysis of the data by the statistics engine and is stored in the statistics buffer. The trigger component monitors the information stored by the statistics buffer to determine when the trigger condition of the selected trigger has been met. The traffic capture components respond to instruction by the trigger component to retain the portion of the communications traffic relating to the trigger condition. As already mentioned, these components operate at line speed so as to eliminate any latency between discovery of the trigger condition and retention of the data relating to it.

The trigger condition utilized by the trigger can comprise statistical and transactional characteristics of the data stream. Trigger conditions that are based on these characteristics are more easily definable than conditions based on specific bit patterns. For example, the present triggering system can be set to trigger on a characteristic of an atomic (multiple event) transaction, such as when the transactional response time between two specified network devices exceeds a certain time value. Known bit pattern triggering systems are unable to perform such time-based, transactional triggering. Thus, instead of requiring the user of the protocol analyzer to set a discrete event trigger based on particular data content, more abstract symptomatic characteristics of the data stream, such as average transactional data throughput or average error rates over time, may be chosen as trigger conditions. This enables an end user with limited knowledge of the protocol and nature of the communications network to more easily and accurately set triggers, thereby allowing the protocol analyzer to capture the desired data for subsequent analysis.

Triggers may be selected, and the associated parameters of the corresponding trigger condition defined, by the user via one or more templates. A plurality of templates, covering a variety of possible problem conditions upon which triggers may be based, are preprogrammed into the present system to further facilitate its use by those lacking an in-depth knowledge of the detailed protocol of the communications network. If desired, each template can be presented to the user via a graphical user interface.

Once selected and its parameters set, the trigger governs operation of the present system to search for and identify the associated trigger condition relating to a particular problem condition that is desired to be found in the data stream. If the problem condition matching the parameters of the trigger condition is encountered during analysis of the data stream, the trigger actuates, and capture by the traffic capture buffer of the desired portion of data from the data stream related to the problem condition is accomplished.

In sum, the present system expands the functionality of protocol analyzers by triggering data capture based on high level statistical characteristics of the communications network data stream, including transactional elements. Thus, triggers based on such statistical elements can be used by the PA in order to capture the desired data for further analysis at a later time and correction of problem conditions present in the data stream.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
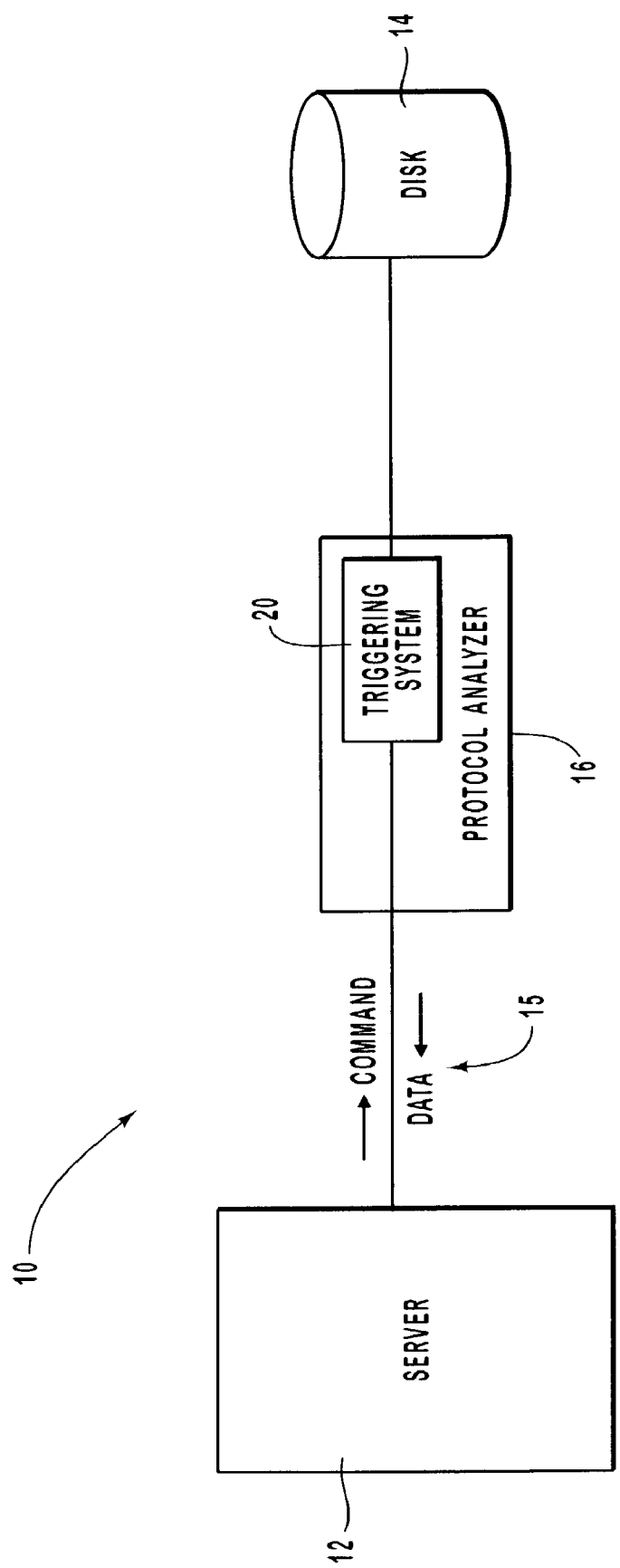
FIG. 1 is a simplified view of a portion of an exemplary communications network, including a protocol analyzer employing an embodiment of the present invention.
Figure 2:
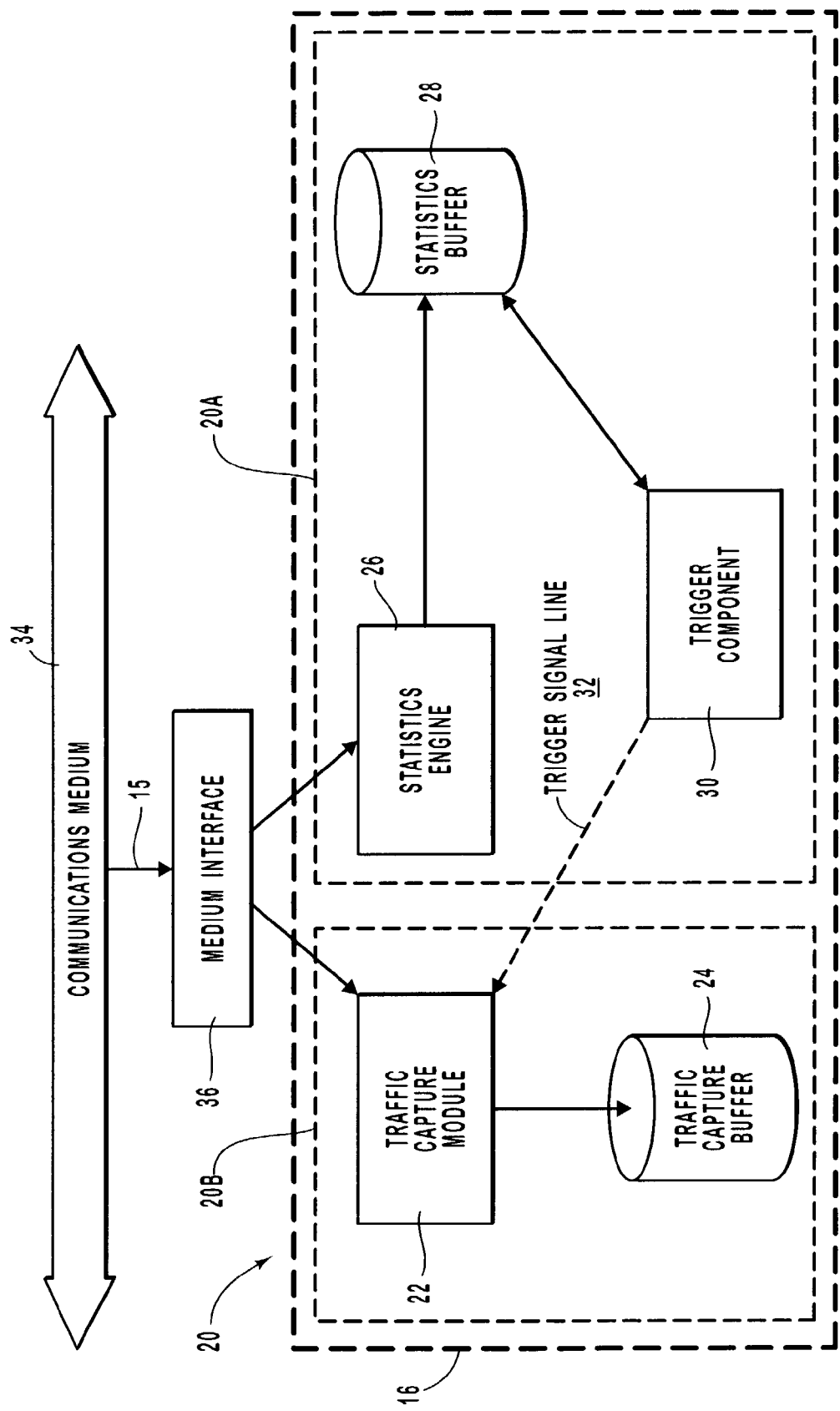
FIG. 2 is a schematic view of various features of one embodiment of the present invention and its relationship to the communications network.
Figure 3:
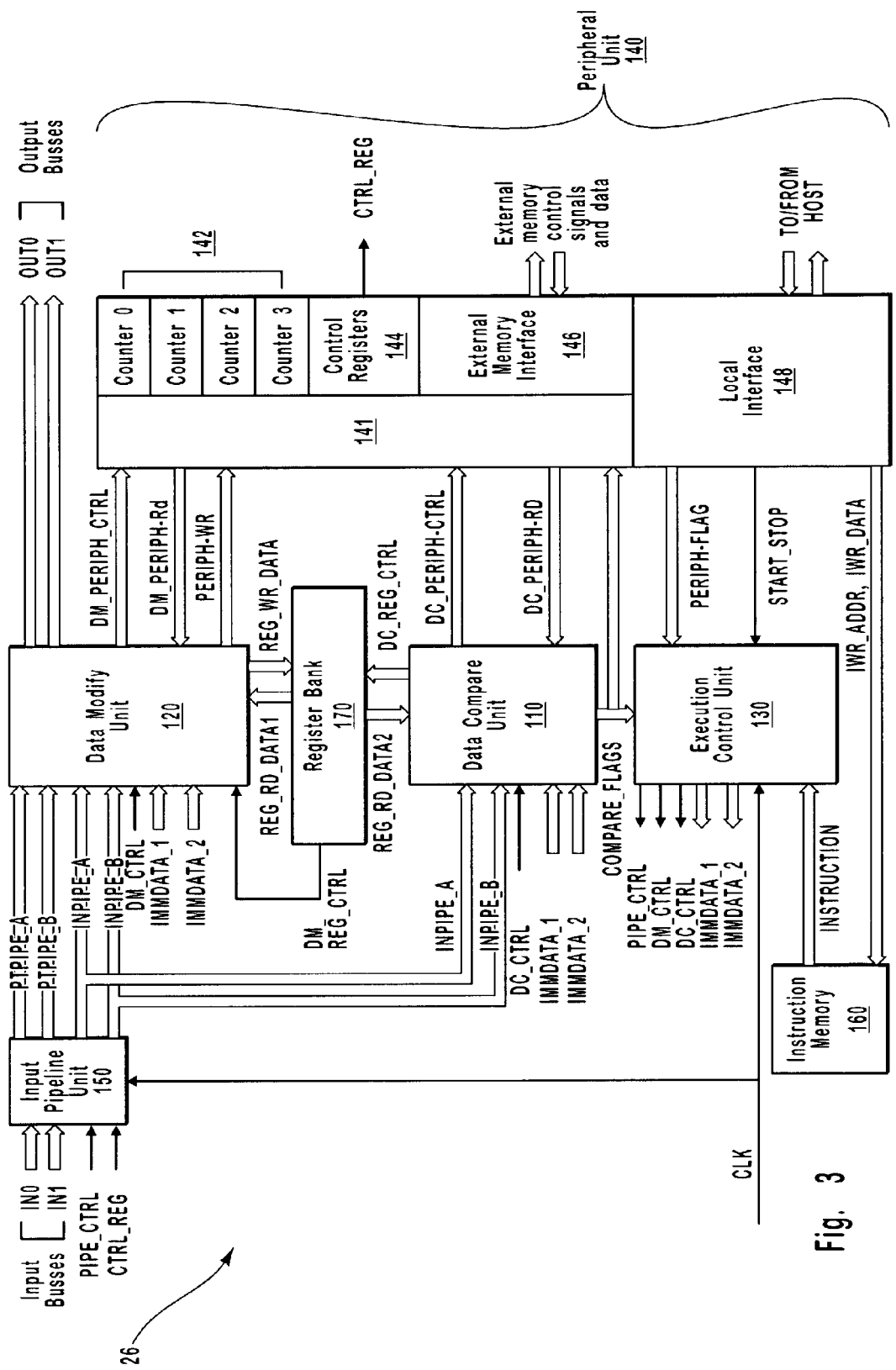
FIG. 3 is a schematic view of various features of a synchronous statistics engine, comprising one component of the present invention.

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale. FIGS. 1–3 depict various features of embodiments of the present invention, which is directed to a system and method that enables data from a communications network to be triggered and captured according to the high level statistical characteristics of the data stream. The present system enables such triggering to occur at a real-time, line speed basis so as to facilitate its use with high speed networks having line speeds exceeding 1 Gbit per second. This in turn enables users lacking detailed knowledge of communications network protocols to set more accurate triggers for the capture of data in order to diagnose and correct problem conditions within the data stream.

Reference is first made to FIG. 1, which shows a simplified view of a portion of a communications network, generally designated at 10. As illustrated, the communications network 10 comprises a portion of a storage area network ("SAN"), which is used for accessing and storing various types of data. It is appreciated however, the communications network 10 could comprise any one of a variety of networks, including, for example, local area computing networks, wide area networks, etc. The communications network 10 includes various components that communicate with one another via the network. For example, as shown in FIG. 1, the communications network 10 comprises a server 12 and a storage component 14, such as a disk. Data may be exchanged between these two components, for example, via a command issued by the server 12 to the storage component 14 and a responsive transmission return of the desired data from the storage component to the server 12. Transmitted data, such as that just described, is referred to herein as communications traffic, and is indicated at 15 in FIG. 1. The communications traffic 15 is transmitted via network components by processes well known in the art. The data contained in the communications traffic 15 can comprise both physical protocols, which characterize the nature of the data, and logical protocols that include the content of the data itself. Of course, in addition to the components shown, the communications network 10 may comprise various other components, as is appreciated by those skilled in the art.

As seen in FIG. 1, a protocol analyzer 16 is disposed in relation to the communications network 10 so as to be able to monitor communications traffic 15 between any two nodes of the network such as the server 12 and the storage component 14. As explained above, the protocol analyzer 16 may be employed to detect and debug erroneous or aberrant data communications that are included in the communications traffic 15. The protocol analyzer 16 includes a triggering system of the present invention, generally designated at 20. The triggering system 20 enables the protocol analyzer 16 to engage in real-time, line speed monitoring and triggering of events occurring in the communications traffic 15, thereby enabling the capture of the desired data in the traffic. Further operating details of the triggering system 20 are given below.

Though discussed herein as a component of the protocol analyzer 16, it is appreciated that the triggering system 20 can be configured as a separate and discrete component, or incorporated into another data processing device. Thus, the configuration of the triggering system 20 with respect to the protocol analyzer 16 as shown in FIG. 1 is merely an exemplary embodiment of the present invention and is not meant to limit it in any way. Moreover, the disposal of the protocol analyzer 16 in relation to the other network components as shown in FIG. 1 is merely exemplary; generally speaking, the protocol analyzer 16 is located within the communications network 10 so as to be able to monitor and process communications traffic 15 occurring between various components of the network, and/or between a component of the network and external devices. Thus, it is appreciated that the protocol analyzer could be interconnected with the communications network 10 in any one of a variety of configurations, and thus is not limited to the particular configuration shown in FIG. 1.

Reference is now made to FIG. 2, which illustrates various components comprising the triggering system 20 in accordance with one embodiment of the present invention. As already discussed, the triggering system 20 is configured to enable the capture of desired data contained in the traffic of a communications network based on one or more statistical characteristics of that data. Also, as mentioned above, the various components of the triggering system 20 shown in FIG. 2 are preferably contained within a protocol analyzer, such as that designated at 16 in FIG. 1.

In the illustrated embodiment, the triggering system 20 generally comprises a trigger segment 20A and a capture segment 20B. Specifically, the capture segment 20B comprises a traffic capture module 22 and a traffic capture buffer 24, while the trigger segment 20A comprises a statistics engine 26, a statistics buffer 28, a trigger component 30, and a trigger signal line 32. The triggering system 20 is connected to the communications medium 34, which carries the communications traffic 15, via a medium interface 36, as is well known in the art. In the illustrated embodiment, the triggering system 20 is implemented as a protocol analyzer, such as that shown at 16 in FIG. 1. Other configurations for the triggering system 20 are also contemplated.

Each component of the triggering system 20 is described here in greater detail. The traffic capture module 22 is configured to receive the communications traffic 15 from the communications medium 34 via the medium interface 36. The traffic 15 received by the traffic capture module 22 is continually input into the traffic capture buffer 24. The traffic capture module 22 also includes an input for the trigger signal line 32 that interconnects the capture module with the trigger component 30. The connection of the trigger component 30 with the traffic capture module 22 via the trigger signal line 32 is necessary to enable the high-speed triggering capability of the present invention as described further below. However, the operable connection between the traffic capture module 22 and the trigger component 30 can be accomplished by a variety of means.

The traffic capture buffer 24 receives the communications traffic 15 in a continuous fashion from the traffic capture module 22. The traffic capture module 22 can apply one or more data filters to the incoming traffic 15 to limit the data that is sent to the traffic capture buffer 24 to data that is most pertinent to the analysis performed by the protocol analyzer 16. The traffic capture buffer 24 is configured to store the data until it is overwritten by subsequent incoming data from the traffic capture module 22. In one embodiment, data capture by the traffic capture buffer 24 is performed in a circular manner such that once the buffer is filled, any new data that is added will overwrite the oldest data that is present in the buffer. Thus, it is seen that a given data packet within the captured communications traffic 15 remains in the traffic capture buffer 24 for only a limited time before being overwritten by new, incoming data.

As will be explained in greater detail below, the capture segment 20B, comprising the traffic capture module 22 and the traffic capture buffer 24, is configured in accordance with the present invention to enable the capture of data contained in the traffic 15 when the triggering system 20 is triggered by a triggering event. The traffic capture buffer 24 can be configured to capture data in one of several ways. In one embodiment, when the triggering system is triggered, the traffic capture module 22 is instructed to stop sending new data to the traffic capture buffer 24, thereby preserving all presently existing data within the buffer. Alternatively, the traffic capture module 22 may be configured to commence traffic output to the traffic capture buffer 24 after the triggering event occurs and continue the capture for a specified amount of time. Thus, the traffic capture buffer 24 can be configured to retain data from the traffic stream 15 prior to the triggering event, after the triggering event, or in yet another embodiment, some combination of the two.

The statistics engine 26 forms a central component of the trigger segment 20A of the triggering system 20 by receiving the communications traffic 15, processing it, and forwarding related statistical information to the statistics buffer 28. The communications traffic 15 received by the statistics engine 26 is preferably processed by the engine at the wire-speed of the communications medium 34 so as to minimize any latency between the receiving of the traffic and the processing thereof. Thus, the statistics engine 26 operates synchronously with the communications medium 34. As can be seen from FIG. 2, the communications traffic 15 is simultaneously sent to both the traffic capture module 22 and the statistics engine 26. In contrast to the communications traffic 15 received by the traffic capture module 22, however, the traffic received by the statistics engine 26 in presently preferred embodiments is unfiltered so as to enable the engine to perform comprehensive data analysis thereon.

In brief, during operation of the triggering system 20, the statistic engine 26 receives the communications traffic 15 from the communications medium 34. As already discussed, the communications traffic 15 comprises a continuous stream of data containing both physical and logical protocols. The statistics engine 26 identifies and analyzes the logical protocols of the data and extracts therefrom the desired statistical information to be used in determining whether a specified trigger condition has been met. The relevant statistics generated by the statistics engine 26 are forwarded by the statistics engine to the statistics buffer 28. Further details concerning the statistics engine 26 are found further below.

The statistics buffer 28 receives and compiles relevant statistical information forwarded by the statistics engine 26. This information is held by the statistics buffer 28 and monitored periodically by the trigger component 30. The character of the information that is retained by the statistics buffer 28 depends upon the type of trigger that is set by the end user. Non-limiting examples of such information include beginning and ending network event times, megabytes transmitted, device status, initiator/target/logical unit number ("I/T/L") statistics, SCSI commands, percent management frames, etc. It is appreciated that many other types of statistical information can be compiled that are pertinent in determining when a trigger condition corresponding to the selected trigger has occurred.

The trigger component 30 is in communication with the statistics buffer 28 so as to enable the trigger component to continuously monitor the statistical information compiled by the buffer. The interface between the statistics buffer 28 and the trigger component 30 allows the trigger component to monitor the accumulated statistical information in the buffer and compare it to the parameters of the selected trigger condition. In one embodiment, in addition to monitoring the statistical information compiled by the statistics buffer 28, the trigger component 30 also stores the selected trigger and corresponding parameters that define the trigger condition, as explained below.

Reference is now made to FIG. 3, which depicts various details of one embodiment of the statistics engine 26. While FIG. 3 illustrates a specific embodiment of a statistics engine, the invention can also be practiced with other processing engines that can be used to perform protocol analysis. As suggested above, the statistics engine 26 is capable of synchronously processing data on a line speed basis, thus eliminating the need for moving the data in and out of registers or internal engine memory, which in turn eliminates latency between the input of data from the communications traffic 15, and the analysis and subsequent output of selected portions of that data to the statistics buffer 28. In either case, the use of software-based instructions enables the statistics engine 26 to be programmed to handle any communications network protocol. Further details concerning the specific hardware construction and operation of the example of a statistics engine 26 illustrated in FIG. 3 may be obtained from U.S. patent application Ser. No. 09/976,756, entitled "Synchronous Network Traffic Processor," filed Oct. 12, 2001, which is incorporated herein by reference in its entirety.

Figure 4:
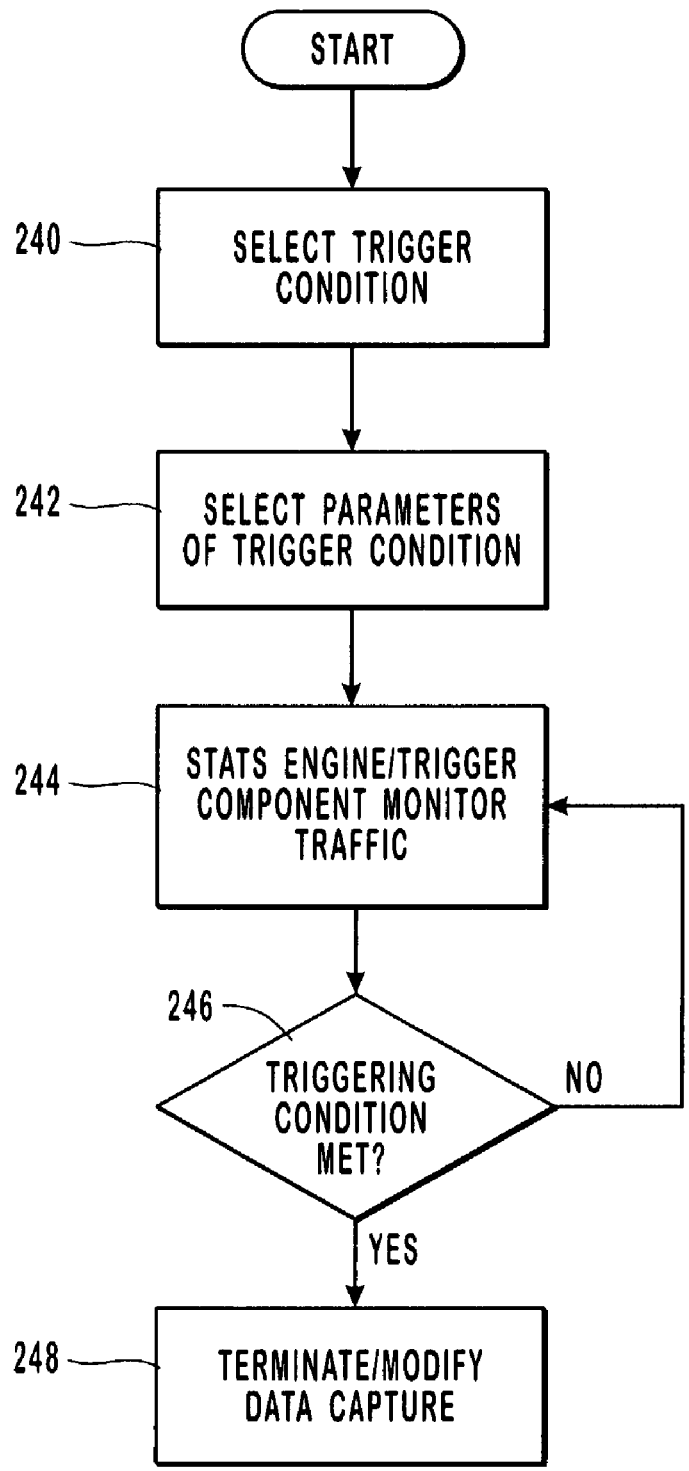
FIG. 4 is a flow chart showing various steps of the present method for statistical triggering according to one embodiment thereof.

Reference is now primarily made to FIG. 4, as well as to FIGS. 2 and 3, wherein various details concerning the operation of the present triggering system 20 are illustrated. The steps shown in FIG. 4 are described in accordance with one embodiment of the present method of triggering data capture, wherein the triggering system 20 comprises part of a protocol analyzer, such as that shown in FIG. 1. However, it is appreciated that the triggering system 20 could be employed in various other configurations. Step 240 of the present method includes selection of the trigger condition by the user. The trigger condition specifies what particular statistic or characteristic of the incoming traffic data will cause the contents of the traffic capture buffer 24 to be retained.

In accordance with presently preferred embodiments of the present invention, the trigger condition can comprise a statistical characteristic related to the data contained in the communications traffic 15, particularly statistics relating to a transactional interaction between two components of the communications network 10. Transactional statistics that can represent triggering conditions according to the invention include those that relate to the state of the communications traffic or the state of one or more of the network components that are associated with the communications traffic 15. Thus, the triggering system of the present invention, upon identifying and decoding data associated with communications traffic 15 at runtime, can also update counters or update the state of specified network components associated with the communications traffic, and can do so at runtime. In this manner, the triggering system 20 can identify the occurrence of a triggering condition that relates to transactional interaction between specified network components.

In order to trigger using transactional attributes of the data, the statistics engine can recognize and associate characteristics or attributes of individual events (frames) associated with multi-frame logical transactions and can maintain statistics about those characteristics or attributes of the individual transactions. Transactions are composed of multiple discrete events that are related to form single atomic logical entities. The attributes of these "higher level" transactions can be important indicators of problems within a network and offer a higher level of abstraction for specifying triggers. Examples of such "associating" characteristics or attributes include protocol transaction constructs, such as Fibre Channel OXID or SCSI Queue Tag. According to one embodiment, the statistics engine is capable of maintaining statistics about thousands of different transactions that are in progress simultaneously, so as to provide significant flexibility in its ability to trigger using transactional attributes of data. While any of a number of transactional events can be used in combination with the triggering system of the invention, several specific examples are set forth hereinafter.

In an exemplary implementation of the present method outlined in FIG. 4, the selected trigger condition can comprise a transactional event, such as SCSI read megabytes ("MB") per second between a specified initiator, such as a server, and a specified target, such as a hard drive, which has associated therewith a logical unit number, or LUN. This initiator-to-target-logical unit number relationship is also referred to as "I/T/L." Other examples of transactional events include the number of pending exchanges between specified initiators and targets and the monitoring of credits associated with communications traffic. In general, the invention extends to the monitoring of any of a variety of transactional events that can be interpreted as triggering conditions, including those that will be understood by those of skill in the art upon learning of the information disclosed herein. In order to be used with a desired transactional event, the statistics engine is adapted as necessary to monitor the appropriate statistics associated with the desired transactional event.

Once the trigger condition has been selected by the user in step 240, step 242 is initiated, which involves the user selecting the desired parameters of the trigger condition selected in step 240. For instance, in the present example that relates to SCSI read MBs per second, a range of maximum and minimum SCSI read MBs per second between the two specified I/T/L components are defined. If the SCSI read MB per second value as collected and analyzed by the triggering system 20 either exceeds or dips below this range, the triggering condition is met and triggering occurs. In one embodiment, both the trigger condition and the user-definable parameters of the trigger condition are input and stored in the trigger component 30 so as to enable the capture of the data within the traffic capture buffer 28 upon the trigger condition being met. The trigger component 30 is in operable communication with the statistics engine 26 to enable operation of the engine to be coordinated with the selected trigger condition that has already been loaded into the trigger component 30.

Once the desired trigger condition and condition parameters have been set by the user, the triggering system 20 shown in FIG. 2 is activated in step 244, wherein the triggering system begins monitoring the incoming communications traffic 15 from the communications medium 34. In this step, the communications traffic 15 is continually monitored by the statistics engine 26 at line speed. Data that pertains at least to the selected trigger condition is compiled from the traffic 15 by the statistics engine 26 and forwarded to the statistics buffer 28, where it is maintained for a specified period. In the present example, data pertaining to SCSI read MBs per second for the designated I/T/L components would be detected by the statistics engine 26. This is done by first inputting the communications traffic 15 into the statistics engine 26. The various data packets contained in the communications traffic 15 are then analyzed at line speed by the statistics engine 26 according to the selected trigger condition criteria. In the present example, data relating to the quantity and speed of SCSI reads for the specified I/T/L in MBs per second is detected by the statistics engine 26. The data is then statistically processed and counted, etc. As already noted, the processed and counted statistics regarding SCSI reads for the specified I/T/L are then forwarded to the statistics buffer 28, where they are compiled over time and remain for a specified period of time.

In presently preferred embodiments, the above analysis performed by the statistics engine 26 is a continually iterative process. Thus, for each datum relating to the selected trigger condition that is detected by the statistics engine 26, at least one statistical counting is made and sent to the statistics buffer 28, where it is compiled with other statistical countings that were processed by the statistics engine. In normal operation, therefore, for every 100 events detected by the statistics engine 26 that relate to the trigger condition, 100 statistical countings are made, which are then collected and compiled within the statistics buffer 28.

In step 246, the trigger component 30 monitors the statistics relating to trigger condition parameters that have been detected and analyzed by the statistics engine 26 and compiled and stored in the statistics buffer 28. The trigger component 30 monitors these statistics to determine whether the selected trigger condition has been met, according to the defined parameters. In the present example, the trigger condition is met if the trigger component 30 determines, after monitoring the compiled statistics in the statistics buffer 28, that the quantity of SCSI read MBs per second has fallen below a certain threshold level defined by the trigger condition parameters. As can be seen by FIG. 4, if the triggering condition is not met, gathering and processing of incoming data in the communications traffic 15 is continued by the statistics engine 26. However, if the trigger component 30, after sampling the statistics maintained by the statistics buffer 28, determines that the trigger condition has been met, as above, the trigger signal line 32 shown in FIG. 2 is raised.

In step 248, if the trigger condition in step 246 is met and the trigger signal line 32 is raised, the traffic capture module 22, which has an input line connected to the trigger signal line, terminates the stream of traffic being sent to the traffic capture buffer 24. In one embodiment, for example, a determination by the trigger component 30 that SCSI read MBs per second has fallen below the threshold range specified in the parameters of the trigger condition causes the trigger signal line 32 to activate the traffic capture module 22, thereby immediately terminating delivery of overriding data to the traffic capture buffer 28. Thus, data leading up to the triggering event is preserved within the traffic capture buffer 24, enabling it to be further analyzed at the user's discretion. In another embodiment, triggering by the trigger component 30 causes the traffic capture module 22 to capture data in the traffic capture buffer 28 for a specified amount of time only after the triggering occurred. In yet another embodiment, data capture is performed both before and after the triggering event. This last option enables traffic conditions existing both before and after the triggering event to be analyzed. By analyzing the portion of the communications traffic 15 preserved in the traffic capture buffer 24, a technician is able to determine the nature of the data that caused the trigger condition to be met. This, in turn, enables the technician to debug errors or problem conditions present in, or manifested by, the communications traffic 15.

Figure 5:
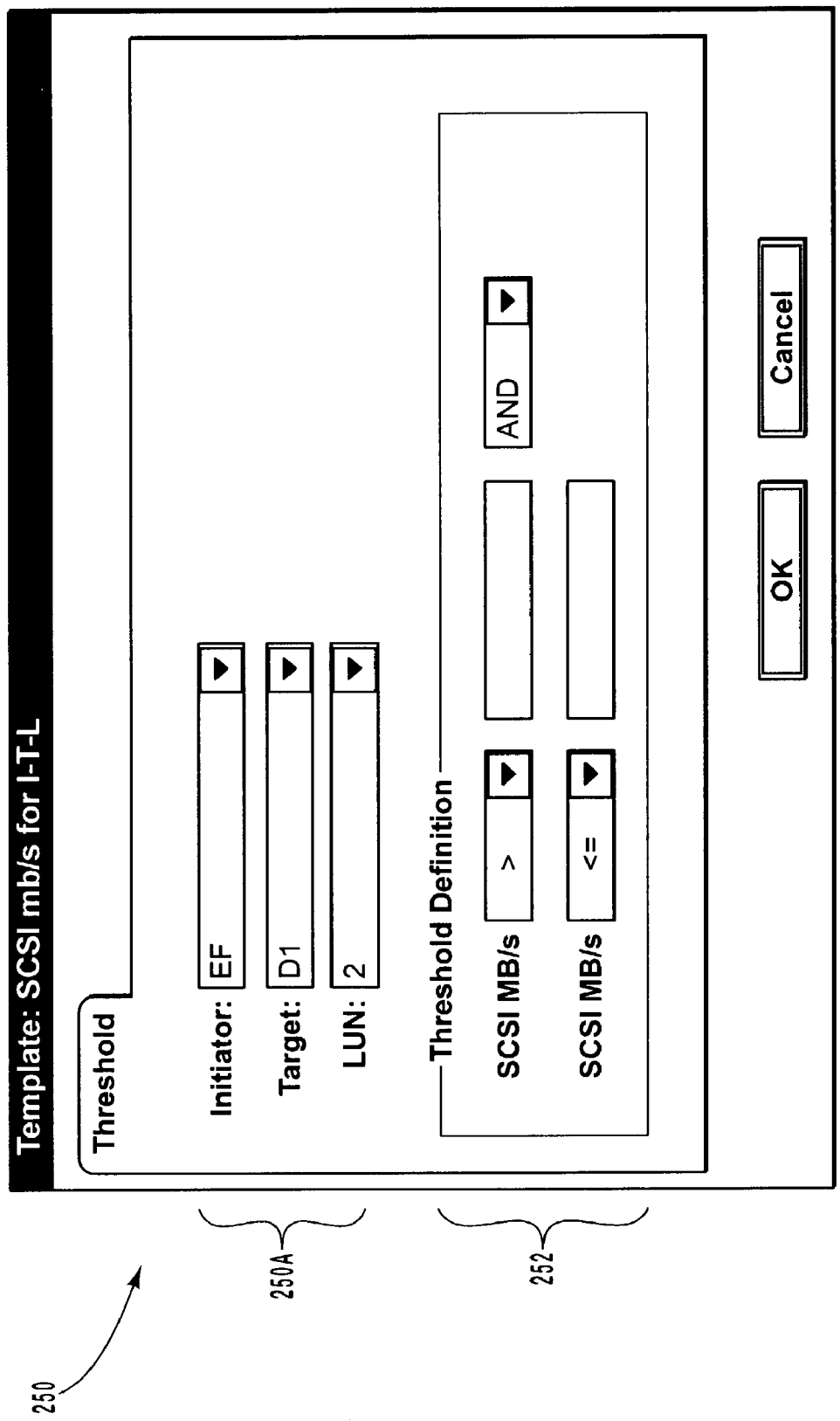
FIG. 5 is a representative view of a graphical user interface template that may be used in conjunction with one embodiment of the present invention.

In one presently preferred embodiment, the selection of a trigger condition and its associated parameters outlined in steps 240 and 242 of FIG. 4 above is performed via a graphical user interface ("GUI") template, such as the template shown generally at 250 in FIG. 5. The GUI template 250 is displayed via a monitor of a host computer or protocol analyzer, and enables the user to choose from a pre-selected number of triggers that are preferably firmware-embedded in the hardware of the triggering system 20. Additionally, the user may use the template 250 to define specific parameters 252 that define the trigger condition pertaining to the selected trigger. For instance, in FIG. 5 the trigger represented by the selected template 250 comprises SCSI read MBs per second for a particular I/T/L relationship. The template 250 can enable the user to define which network components will comprise the initiator, the target and logical unit number, which in the present example, comprise components identified as EF, D1, and 2, respectively, and which are listed at 250A. The parameters 252 define the trigger condition thresholds, which in the illustrated example, comprises maximum and minimum threshold values for SCSI read MBs per second for the specified I/T/L relationship. If these trigger condition thresholds are exceeded, the trigger is actuated. The parameters 252 may comprise one, two, or more thresholds that together define the trigger condition. Advantageously, the trigger conditions are geared to traffic characteristics the user is likely familiar with, such as SCSI read/write speed, or command-to-first data time, for instance. This in turn enables more accurate triggers to be set, thereby facilitating the capture of desired data from the communications traffic 15.

Because of the ability of the statistics engine 26 to read and analyze incoming communications traffic at line speed, the traffic capture module 22 is able, upon triggering, to instruct the traffic capture buffer 24 to preserve specified data therein before it is overwritten. As already suggested, in one embodiment the traffic capture module 22 can direct the traffic capture buffer to retain data leading up to the triggering event. Thus, the data causing the trigger condition to be met is captured within the traffic capture buffer 24 before the buffer is overwritten by new incoming data. This enables the diagnosis to be made of what caused the triggering to occur. In another embodiment, the traffic capture module 22, upon being activated by the trigger component 30 when the trigger condition is met, can alternatively clear the traffic capture buffer 28 of any data contained therein, and start the gathering of new incoming data from the point when the trigger condition was met. This post-event data capture is useful to examine the response of the communications network to the triggering event, such as how well the network can recover from a problem condition, or how the state of the network is altered when a certain triggering event occurs. This option may be desired when a trigger condition based upon transactional events between network components is used. Finally, some embodiments allow for a combination of the above two configurations to be utilized, wherein data from both before and after the triggering event are preserved in the traffic capture buffer 28. In this case, the first half of the traffic capture buffer will be filled with data leading up to the triggering event, while the second half of the buffer is filled with data immediately following the event. In many instances, this configuration is preferred as it provides a "before and after" view of the communications traffic 15.

A large number of statistics with respect to the communications traffic 15 may be used to define trigger conditions in accordance with embodiments of the present invention. Of particular utility is the ability of the present triggering system to trigger on transactional events occurring between components of the communications network 10. In addition to the transactional example relating to SCSI read operations given above, transactions such as SCSI write operations or the average amount of data sent per SCSI transaction can be employed as trigger conditions. These types of trigger conditions require a triggering system, such as the present invention, that can analyze and retain information concerning SCSI transactions between initiators and targets over time.

Another non-limiting example of transactional-based triggering involves transactional performance statistics. Logical transactions using the Fibre Channel protocol are known as exchanges. These exchanges can comprise individual commands and data that are sent between a specified initiator and target. In order to effectively utilize available bandwidth on the communications network, several of these exchanges may be pending between the initiator and the target at any given time. The present triggering system, operating at line speed, enables the number of pending exchanges for a specified I/T/L link to be tracked in real-time, thereby enabling the operation of the network to be assessed. This capability is not possible with known protocol or network analyzers.

In yet another example, a trigger could be set to detect the failure of a particular disk drive in a storage area network to respond to commands. In the latter case, the user may set a trigger condition and parameters based on an easily definable symptom, such as the value of SCSI MBs per second for the particular disk drive over a specified period of time. This and the other examples above further illustrate one advantage of the present invention in that the user may choose the trigger condition according to the observed symptom, and not according to particular data patterns present in the communications traffic stream. Again, the capability illustrated by the above examples is not possible with known protocol or network analyzers.

Of course, triggers that are concerned with problem conditions that are more purely statistical in nature are also associated with the invention. For instance, in some communications networks it may be useful to track the number of device logins over a specified amount of time. Network devices can use the login procedure not only to initially connect to the network, but also to attempt recovery from an error condition. A large number of device logins could indicate a problem condition existing with a particular device, or the communications network in general. The present triggering system can be utilized to detect such problem conditions. The triggering system could be set to trigger when a certain number of device logins are detected within a specified time period. A trigger condition that triggers data capture when five or more logins are detected within a two-second interval is but one example of how this functionality can be implemented.

Another statistical triggering involves embedded protocols, in which multiple protocol data units ("PDUs") of one protocol can be embedded into a single PDU of another protocol. One example of the foregoing is embedding multiple SCSI commands into a single IP data packet. The present triggering system is capable of specifying triggers based on the transactional attributes of the embedded protocol in situations in which multiple PDUs of one protocol are encapsulated into a single PDU of another protocol. The triggering system enables the line speed tracking of protocol state information in the communications network by the statistics engine, and can detect the presence of one or more PDUs associated with the embedded protocol information. The information contained in the PDUs can then be decoded and analyzed at line speed as described above. The ability to detect and analyze the transactional attributes of embedded PDUs represents a significant advance in the art.

Finally, it is noted that the statistical or transactional triggers discussed above can be combined with one another or with other known triggers, such as the recognition of simple bit patterns in the communications traffic, to form a composite trigger.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A system for capturing data transmitted via a communications network, the system being able to capture the data as a result of satisfying a trigger condition, the system comprising:
   a statistics engine synchronously operable with the communications network, wherein the engine continuously receives successive portions of the data transmitted via the communications network, and wherein the engine continuously analyzes the data at a rate equal to the rate at which the data is transmitted via the communications network, and wherein the engine also selects and outputs statistical and transactional data of interest relating to the trigger condition; and
   a trigger component, wherein the trigger component is operable to monitor the statistical and transactional data of interest relating to the trigger condition that is output by the statistics engine, and wherein the trigger component controls the capture of a selected portion of the data transmitted via the communications network when the trigger condition is satisfied by the statistical and transactional data of interest.

2. A system for capturing data as defined in claim 1, further comprising:
   a traffic capture component, wherein the traffic capture component captures the selected portion of the data transmitted via the communications network according to instructions sent by the trigger component to the traffic capture component.

3. A system for capturing data as defined in claim 1, wherein the data of interest comprises statistical information relating to the data transmitted via the communications network.

4. A system for capturing data as defined in claim 3, wherein the data of interest further comprises statistical information relating to transactional events between components interconnected via the communications network.

5. A system for capturing data as defined in claim 1, further comprising:
   a statistics buffer operable to store data of interest relating to the trigger condition that is outputted by the statistics engine.

6. A system for capturing data as defined in claim 1, wherein the traffic capture component further comprises:
   a traffic buffer operable to store successive portions of data transmitted via the communications network, the traffic buffer also operable to store the selected portion of the data transmitted via the communications network that is captured by the traffic capture component.

7. A system for capturing data as defined in claim 1, wherein the trigger component and the traffic capture component are electrically connected via a trigger signal line.

8. A system for capturing data as defined in claim 1, wherein the system further comprises firmware that contains instructions for operating the system.

9. A system for capturing data as defined in claim 8, wherein the trigger condition is stored in the firmware, and wherein the trigger condition is selected by a user.

10. A system for capturing data as defined in claim 1, wherein a user selects the trigger condition via a graphical user interface.

11. A system for capturing data as defined in claim 1, wherein the selected portion of data that is captured by the traffic capture component comprises data that was transmitted via the communications network both before and after the trigger condition was satisfied.

12. A system for capturing data as defined in claim 1, wherein the trigger component is operable to instruct the statistics engine as to what data of interest should be output to the trigger component.

13. A protocol analyzer for a communications network, the protocol analyzer including a system for capturing data transmitted via a communications network, the system being able to capture the data as a result of satisfying a trigger condition, the system comprising:
   a statistics engine synchronously operable with the communications network, wherein the engine continuously receives successive portions of the data transmitted via the communications network, and wherein the engine continuously analyzes the data, and wherein the engine also derives from the data statistical information that relates to the trigger condition, and wherein the engine outputs the statistical information;
   a trigger component, wherein the trigger component is operable to monitor the statistical information relating to the trigger condition that is output by the statistics engine, and wherein the trigger component controls the capture of a selected portion of the data transmitted via the communications network when the trigger condition is satisfied by the statistical information; and
   a traffic capture component, wherein the traffic capture component captures the selected portion of the data transmitted via the communications network according to instructions sent by the trigger component to the traffic capture component.

14. A protocol analyzer as defined in claim 13, wherein the statistics engine analyzes the data transmitted via the communications network at a rate equal to the rate at which the data is transmitted via the communications network.

15. A protocol analyzer as defined in claim 14, further comprising:
   a statistics buffer operable to store the statistical information relating to the trigger condition that is outputted by the statistics engine.

16. A protocol analyzer as defined in claim 15, wherein the traffic capture component further comprises:
   a traffic buffer operable to store successive portions of data transmitted via the communications network, the traffic buffer also operable to store the selected portion of the data transmitted via the communications network that is captured by the traffic capture component.

17. A protocol analyzer as defined in claim 13, wherein the trigger condition is stored in the firmware, and wherein the trigger condition is selected by a user.

18. A protocol analyzer as defined in claim 17, wherein the user selects the trigger condition via a graphical user interface.

19. A protocol analyzer as defined in claim 13, wherein the statistical information comprises the logical protocol of the data transmitted via the communications network.

20. A protocol analyzer as defined in claim 13, wherein the selected portion of data that is captured by the traffic capture component comprises data that was transmitted via the communications network before the trigger condition was satisfied.

21. A protocol analyzer as defined in claim 13, wherein the selected portion of data that is captured by the traffic capture component comprises data that was transmitted via the communications network after the trigger condition was satisfied.

22. A protocol analyzer as defined in claim 13, wherein the selected portion of data that is captured by the traffic capture component comprises data that was transmitted via the communications network both before and after the trigger condition was satisfied.

23. A protocol analyzer as defined in claim 13, wherein the statistical information further relates to transactional events between components interconnected via the communications network.

24. A protocol analyzer as defined in claim 23, wherein the statistical information that satisfies the trigger condition relates to the amount of time transpiring between a command issued by a first network device and a response to the command that is issued by a second network device.

25. A protocol analyzer as defined in claim 23, wherein the statistical information that satisfies the trigger condition relates to the number of transactional exchanges that are pending between network devices.

26. A protocol analyzer as defined in claim 23, wherein the statistical information that satisfies the trigger condition relates to the failure of a network device to respond to a command issued by another network device.

27. A protocol analyzer as defined in claim 13, wherein the statistical information is compiled over time.

28. A protocol analyzer as defined in claim 13, wherein the statistical information that satisfies the trigger condition relates to the number of login attempts made by network devices in the communications network.

* * * * *